May 16, 1939.  L. C. DRAKE  2,158,854
SALT MIXTURE FOR USE AS A THERMOPHORE
Filed Aug. 20, 1937
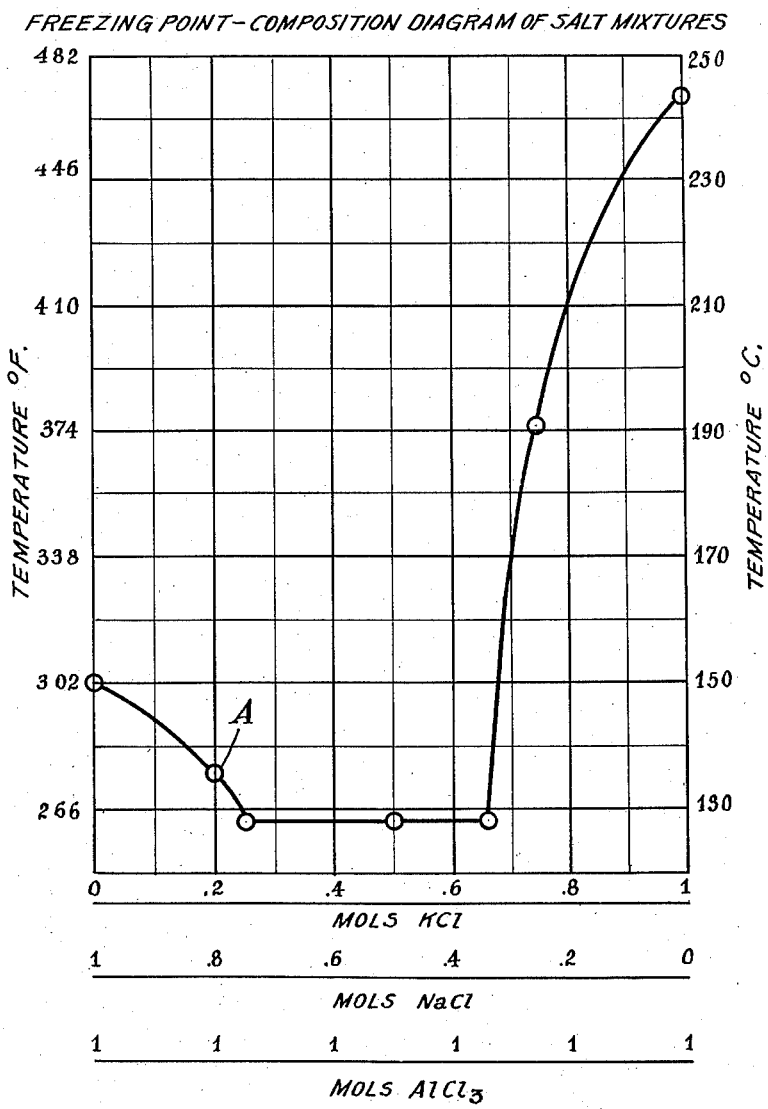

Patented May 16, 1939

2,158,854

UNITED STATES PATENT OFFICE 2,158,854

SALT MIXTURE FOR USE AS A THERMOPHORE

Leonard C. Drake, Woodbury, N. J., assignor to Socony-Vacuum Oil Company, Incorporated, New York, N. Y., a corporation of New York Application August 20, 1937, Serial No. 160,021

4 Claims. (Cl. 252—5)

This invention has to do with fusible mixtures of inorganic salts intended to be used in liquid form for the storage, transmission, addition or extraction of heat, as for example, as a heat exchange medium for the transmission of heat to or from a chemical reaction.

A heat exchange medium or thermophore for such uses should be very definitely possessed of certain special properties. It must be possessed of a density and specific heat in the range of temperature where its use is contemplated which will permit handling the desired heat load with a reasonable amount of mechanical load caused by handling the medium. It must be of reasonably low viscosity at the temperatures of use to permit easy pumping and readily controlled flow. It must be comparatively stable to prolonged exposure to heat and not prone to decomposition when in contact with the ordinary materials of construction, such as metals, economically practicable for housing the process in which the medium is used. It is important that the medium, whether it decomposes or not, be non-corrosive toward those construction materials. A very important feature for such a medium is that of having a low freezing point, so that proper latitude may be had in handling the medium, and so that it may be handled conveniently in non-operating apparatus where only low-level, non-process heat is available, such as, for example, low pressure steam. Further properties it should possess, if possible, are low toxicity and low cost.

Many media for such purposes have been proposed. A popular class is that of mixtures of inorganic salts. This invention is concerned with such a mixture. Prior proposals have been made to use mixtures of alkali metal nitrates, mixtures of metallic chlorides, and other salt mixtures, most of which have not completely met one or more of the requirements above outlined.

The object of this invention is to provide a thermophore comprising a mixture of inorganic salts combining the various desirable properties above outlined to a high degree, and particularly, being possessed of a desirably low freezing point which is not restricted to a particular narrow composition, which also is not corrosive to the usual metals used in construction under normal conditions of use.

This invention is based upon the discovery that these objects may be obtained by a mixture of aluminum chloride, sodium chloride and potassium chloride, in certain proportions.

This invention may be readily understood by reference to the attached drawing, which shows freezing or melting points of various mixtures plotted against composition. In this drawing, it will be noted that the vertical scale shows freezing point, while the horizontal scale is such that each point thereon represents a composition consisting of one mol. of aluminum chloride (anhydrous), and varying portions of potassium chloride and sodium chloride. For example, the point designated A represents the freezing point of a mixture of one mol. of aluminum chloride, 0.8 mol. of sodium chloride, and 0.2 mol. of potassium chloride. It will also be noted that the mol.% composition is always 50 mol.% for aluminum chloride and that the sum of the mol.% of sodium and potassium chlorides is always 50%. It will be noted that low freezing temperature (approximately 262° F.), is obtained by mixtures of fairly broad composition limits, ranging from 0.25 to 0.66 mols. of potassium chloride. Compositions within this range form the preferred subject matter of this invention. This composition is of good density and specific heat under proposed conditions of use (from 300° F. to 1000° F.), is quite stable, highly fluid, and not costly. In addition, it is not highly corrosive to ordinary construction metals, a novel and unexpected property, since chloride compositions previously proposed have been quite corrosive. To illustrate this feature, the following table is given, which is to a large degree self-explanatory.

TABLE I 68.1% AlCl₃; 9.5% KCl; 22.4% NaCl
10 days at 850–900° F.

| Metal | Weight before test | Weight after test | Difference | Thickness before test | Thickness after test | Difference |
|---|---|---|---|---|---|---|
| Shelby tubing | 1.977 | 1.962 | 0.015 | 0.0566 | 0.0555 | 0.0011 |
| Boiler plate | 2.286 | 2.268 | 0.018 | 0.0714 | 0.0709 | 0.0005 |
| Cast iron | 2.639 | 2.643 | 0 | 0.0892 | 0.0892 | 0 |

For convenience in the comparative expression of mol. composition and weight per cent, the following table is given.

TABLE II

| Aluminum chloride | | Potassium chloride | | Sodium chloride | |
|---|---|---|---|---|---|
| Mols. | Weight, percent | Mols. | Weight, percent | Mols. | Weight, percent |
| 1 | 64 | 1 | 36 | | |
| 1 | 70 | | | 1 | 30 |
| 1 | 65.4 | 0.75 | 27.4 | 0.25 | 7.2 |
| 1 | 66.7 | 0.5 | 18.7 | 0.50 | 14.6 |
| 1 | 67.6 | 0.33 | 12.6 | 0.67 | 19.8 |
| 1 | 68.1 | 0.25 | 9.5 | 0.75 | 22.4 |
| 1 | 68.4 | 0.20 | 7.6 | 0.80 | 24.0 |

All compositions of these three salts are useful under certain conditions where low freezing point is not important. For most uses, however, those compositions containing from about 0.25 mol.

to about 0.66 mol. of potassium chloride are preferable because of the added virtue of low freezing point. In most cases, the preferred composition is the one containing the least amount of potassium chloride effective for both purposes, that is, one containing 0.25 mol. of that salt.

I claim:

1. A thermophore mixture consisting of anhydrous aluminum chloride, sodium chloride, and potassium chloride.

2. A thermophore mixture comprising anhydrous aluminum chloride, potassium chloride and sodium chloride in the proportion of 50 mol per cent of aluminum chloride and 50 mol per cent of combined alkali metal chlorides.

3. A thermophore mixture comprising anhydrous aluminum chloride, potassium chloride, and sodium chloride in the proportions of 50 mol per cent of aluminum chloride and 50 mol per cent of combined alkali chlorides, the potassium chloride content ranging from about 12.5 mol per cent to about 33 mol per cent.

4. A thermophore mixture comprising anhydrous aluminum chloride about 50 mol per cent, sodium chloride about 37.5 mol per cent, and potassium chloride about 12.5 mol per cent.

LEONARD C. DRAKE.